Patented Nov. 7, 1939

2,178,601

UNITED STATES PATENT OFFICE 2,178,601

MANUFACTURE OF DIOLEFINS

Jacque C. Morrell, Chicago, Ill., assignor to Universal Oil Products Company, Chicago, Ill., a corporation of Delaware No Drawing. Application November 30, 1937, Serial No. 177,280

8 Claims. (Cl. 260—680)

This invention relates more particularly to the treatment of aliphatic or straight chain hydrocarbons which are characterized by unsaturation to the extent of having one double bond in the molecule. It is directed primarily to the treatment of such mono-olefinic hydrocarbons which have less than six carbon atoms in straight chain arrangement including ethylene, propylene, butylenes, and amylenes, although it may also be applied to hydrocarbons having six or more carbon atoms in straight chain arrangement.

In a more specific sense, the invention is concerned with a new and improved type of process for controllably increasing the degree of unsaturation in hydrocarbons of the character mentioned so that a mono-olefinic hydrocarbon may be converted into a diolefin with a practical minimum of undesirable side reactions.

The present process is concerned with the more efficient utilization of mono-olefinic hydrocarbons of the types mentioned above in that they are converted by dehydrogenation into compounds of a more reactive character which are readily utilizable in the production of polymers and miscellaneous hydrocarbon derivatives useful in the arts.

The present process for manufacturing diolefins from mono-olefins is related to the synthetic rubber problem in that butadienes and their alkylated derivatives are producible from 4 and 5 carbon atom aliphatic hydrocarbons and these butadienes are polymerizable to form high molecular weight polymers closely resembling natural rubber.

In experimenting with methods and conditions for converting mono-olefinic hydrocarbons into diolefins by dehydrogenation, a considerable number of catalytic materials have been tried with greater or lesser effectiveness, since it has been found generally that better results in the matter of yield of the more unsaturated diolefins without the formation of liquid and gaseous by-products are obtainable by the use of catalysts rather than by the use of heat alone, and furthermore that under proper catalytic influences temperature, pressures, and time factors are lower, so that less expensive apparatus may be employed and greater capacities insured.

In one specific embodiment the present invention comprises the treatment of mono-olefinic hydrocarbons for the dehydrogenation thereof to diolefins by subjecting said hydrocarbons at elevated temperatures and subatmospheric pressures to contact with solid granular catalysts comprising major proportions by weight of carrying material of relatively low catalytic activity supporting minor proportions by weight of compounds of the elements in the lefthand column of Group IV of the periodic table, and preferably the oxides thereof which have relatively high catalytic activity in furthering simple dehydrogenation reactions.

The present invention is characterized by the use of particular catalytic materials and suitable combinations of temperature, pressure, and time of contact to control the character and extent of the dehydrogenation of mono-olefinic hydrocarbons to produce diolefins with a minimum of undesirable by-products. Temperatures from 500 to 700° C., absolute pressures of approximately 0.25 atmosphere and times of contact of less than 2 seconds constitute in general the best ranges of conditions for the present type of reactions.

The catalysts which are preferred for selectively dehydrogenating mono-olefinic hydrocarbons have been evolved as the result of a large amount of investigation with catalysts having a dehydrogenating action upon various types of hydrocarbons such as, for example, those which are encountered in the fractions produced in the distillation and/or pyrolysis of petroleum and other naturally occurring hydrocarbon oil mixtures. The criterion of an acceptable dehydrogenating catalyst is that it shall split off hydrogen without inducing either scission of the bonds between carbon atoms or carbon separation. The selection of catalysts and conditions favoring the selective production of diolefins from mono-olefins is particularly difficult on account of the general reactivity of the charging materials.

It should be emphasized that in the field of catalysts there have been very few rules evolved which would enable the prediction of what materials will catalyze a given reaction. Most of the catalytic work has been done on a purely empirical basis, though at times certain groups of elements or compounds have been found to be more or less equivalent in accelerating certain types of reactions. For example, the noble metals, platinum and palladium, have been found to be effective in dehydrogenating reactions, particularly in dehydrogenating naphthenes to form aromatics, but these metals are expensive and easily poisoned by traces of sulfur so that their use is considerably limited in petroleum hydrocarbon reactions.

The present invention is characterized by the use of a particular group of composite catalytic materials which employ as their base catalysts or carriers certain refractory oxides and silicates which in themselves may have some slight specific catalytic ability in the dehydrogenating reactions but which are improved greatly in this respect by the addition of certain promoters or secondary catalysts in minor proportions, which comprise in the present instance the compounds and preferably the oxides of the elements in the lefthand column of Group IV of the periodic table including titanium, zirconium, cerium, hafnium, and thorium. The base supporting materials for these compounds are preferably of a rugged and refractory character capable of withstanding the severe use to which the catalysts are put in regard to temperature during service and in regeneration by means of air or other oxidizing gas mixtures after they have become fouled with carbonaceous deposits after a period of service. As examples of materials which may be employed in granular form as supports for the preferred catalytic substances may be mentioned the following:

Magnesium oxide
Aluminum oxide
Bauxite
Bentonite clays
Glauconite (greensand)
Montmorillonite clays
Kieselguhr
Crushed silica
Crushed firebrick The active compounds or promoters which are used in the catalyst composites according to the concepts of the present invention include generally compounds and particularly oxides of titanium, zirconium, cerium, hafnium, and thorium which constitute a natural group since they are the elements in the lefthand column of Group IV of the periodic table. While the compounds and particularly the oxides of these elements are effective catalysts in the dehydrogenation reactions, it is not intended to infer that the different compounds of any one element or the corresponding compounds of the different elements are exact equivalents in their catalytic activity. Furthermore, some of the elements such as titanium, zirconium, and cerium are of more common occurrence and more readily obtainable whereas the elements hafnium and thorium are rare and expensive and not frequently used in practice.

In general practically all of the compounds of the preferred elements will have some catalytic activity in dehydrogenating olefinic hydrocarbons though as a rule the oxides and particularly the lower oxides are the best catalysts. Catalyst composites may be prepared by utilizing the soluble compounds of the elements in aqueous solutions from which they are absorbed by prepared granular carriers or from which they are deposited upon the carriers by evaporation of the solvent. The invention further comprises the use of catalyst composites made by mechanically mixing relatively insoluble compounds with carriers either in the wet or the dry condition. In the following paragraphs some of the compounds of the elements listed above are given which are soluble in water and which may be used to add catalytic material to carriers. The known oxides of these elements are also listed.

Titanium

Compounds which will ultimately yield titanium catalysts on heating to a proper temperature are absorbed by stirring them with warm aqueous solutions of soluble titanium compounds, such as for example titanium nitrate having the formula $5TiO_2.N_2O_5.6H_2O$, which is sufficiently soluble in warm water to render it readily utilizable as a source of titanium oxides. Other soluble compounds which may be used to form catalytic deposits containing titanium are the various alkali metal titanates. Other compounds of titanium acids, including compounds of the alkaline earth and heavy metals may be distributed upon the carriers by mechanical mixing either in the wet or the dry condition. The lower oxides are generally the best catalysts. The oxide resulting from the decomposition of such compounds as the nitrate and the hexahydrate is for the most part the dioxide $TiO_2$. This oxide, however, is reduced by hydrogen, or by the gases and vaporous products resulting from the decomposition of the mono-olefins treated in the first stages of the reactions so that the essential catalyst for the larger portion of the period of service is the sesquioxide $Ti_2O_3$.

Zirconium

The soluble compounds of zirconium which may be used as primary sources of catalytic materials in aqueous solution include the slightly soluble zirconium ammonium fluoride, the tetrachloride, the fluoride, the iodide and particularly the more soluble selenate and sulfate. The crystalline selenate has the formula $Zr(SeO_4)_2.4H_2O$ and the sulfate which is the more soluble of the two, has the formula $Zr(SO_4)_2.4H_2O$. As in the case of the other alternative elements the tetrahydroxide may be precipitated from a solution of the sulfate or other soluble salt onto the surface and into the pores of an active granular carrier by the addition of alkaline carbonate or hydroxide precipitants, after which the zirconium hydroxide is ignited to produce the dioxide. The principal oxide of zirconium is the dioxide and there is little evidence to indicate the existence of a monoxide since the dioxide is not reducible by hydrogen at moderate temperatures and it has been shown that carbon in the electric furnace reduces the dioxide directly to the metal.

Cerium

A properly prepared and activated carrier is ground and sized to produce granules of relatively small mesh of the approximate order of from 4 to 20 and these may be caused to absorb compounds which will ultimately yield compounds of cerium on heating to a proper temperature by stirring them with warm aqueous solutions of soluble cerium compounds, such as for example cerium nitrate having the formula

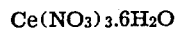

$Ce(NO_3)_3.6H_2O$ which is sufficiently soluble in warm water to render it readily utilizable as a source of cerium oxides. Other soluble compounds which may be used to form catalytic deposits containing cerium are the various alkali metal cerous nitrates, such as for example sodium cerous nitrate having the formula $2NaNO_3.Ce(NO_3)_3.H_2O$. Other compounds of ceric acids, including compounds of the alkaline earth and heavy metals, may be distributed upon the carrier by mechanical mixing either in the wet or the dry condition. As a rule the lower oxides are the best catalysts. Cerium has a number of oxides including the trioxide $CeO_3$, the dioxide $CeO_2$, the heptoxide $Ce_4O_7$, and sesquioxide $Ce_2O_3$. The dioxide results from the ignition of cerous nitrate, cerous sulfate, cerous carbonate or cerous oxalate and also from the ignition of ceric nitrate, ceric sulfate or ceric hydroxide. Hydrogen reduces the dioxide to the heptoxide, and it is probable that this oxide plus a certain amount of the sesquioxide are active catalysts.

Hafnium

In general the properties of hafnium from a chemical and to some extent a catalytic standpoint are intermediate between those of zirconium and thorium though in most reactions hafnium compounds more closely correspond to those of zirconium. There is but one known oxide, the dioxide $HfO_2$ and this oxide is not readily reducible and probably exists as such when used in minor proportions as a constituent of catalyst composites in hydrocarbon dehydrogenation reactions. Soluble compounds of hafnium include the oxychloride having the formula $HfOCl_2.8H_2O$ and the oxalate which is soluble in an excess of oxalic acid. The mixing of this oxalate solution with the miscellaneous carriers proposed and the evaporation of the solution gives a residual material which can be ignited to leave a residue of the dioxide. Hafnium sulfide catalysts may be developed by igniting composites of relatively inert carriers and hafnium sulfate at temperatures of about 500° C. On account of the rarity of hafnium its compounds are seldom commercially utilizable although the oxide in particular has been found to exert a good catalytic influence in the types of reactions under considerations.

Thorium

The element thorium furnishes a number of compounds which can be used as primary sources of catalytic material for deposition upon the types of carriers disclosed. The following compounds are sufficiently soluble in water to enable them to be used in aqueous solution to saturate prepared granular carrier particles; the bromide $ThBr_4$, the chloride $ThCl_4$, the iodide $ThI_4$, and the nitrate $Th(NO_3)_4$ which is most conveniently used as the tetrahydrated or dodecahydrated salt. From any of the soluble salts mentioned the tetrahydroxide $Th(OH)_4$ may be precipitated by the use of alkali carbonates or alkali hydroxides then ignited to produce the dioxide. The phosphates and sulfates and the sulfide are relatively insoluble and may be incorporated with the carrier particles either in the wet or the dry condition. The nitrate may be directly ignited, of course, to produce the dioxide.

While the identification of some other oxides of thorium such as the pentatritaoxide $Th_3O_5$ and the monoxide ThO has been claimed as well as a peroxide having the formula $Th_2O_7$, it has been shown that the principal oxide catalyst in operations of the present character is the ordinary dioxide. It is to be emphasized that the oxide is the preferred catalyst since in general it exhibits greater and more selective catalytic action than any other compounds which may be formed upon the carrier surfaces.

In regard to the base catalytic materials which are preferably employed according to the present invention, some precautions are necessary to insure that they possess proper physical and chemical characteristics before they are impregnated with the promoters to render them more efficient. In regard to magnesium oxide, which may be alternatively employed, this is most conveniently prepared by the calcination of the mineral magnesite which is most commonly encountered in a massive or earthy variety and rarely in crystal form, the crystals being usually rhombohedral. In many natural magnesites the magnesium oxide may be replaced to the extent of several per cent by ferrous oxide. The mineral is of quite common occurrence and readily obtainable in quantity at a reasonable figure. The pure compound begins to decompose to form the oxide at a temperature of 350° C., though the rate of decomposition only reaches a practical value at considerably higher temperatures, usually of the order of 800° C. to 900° C. Magnesite is related to dolomite, the mixed carbonate of calcium and magnesium, which latter mineral, however, is not of as good service as the relatively pure magnesite in the present instance. Magnesium carbonate prepared by precipitation or other chemical methods may be used alternatively in place of the natural mineral. It is not necessary that the magnesite be completely converted to oxide but as a rule it is preferable that the conversion be at least over 90%, that is so that there is less than 10% of the carbonate remaining in the ignited material.

Aluminum oxide itself prepared by the controlled calcination of natural carbonate and hydrate ores, or by chemical precipitation methods, is in itself a fairly good catalyst for accelerating the rate of dehydrogenation of olefins over a considerable temperature range. However, an extensive series of experiments has demonstrated that this catalytic property is greatly improved by the addition of promoting substances in minor amounts, usually of the order of less than 10% by weight of the oxide.

Two hydrated oxides of aluminum occur in nature, to wit, bauxite having the formula

$$Al_2O_3.2H_2O$$

and diaspore having the formula $Al_2O_3.H_2O$. Of these two minerals only the corresponding oxide from the bauxite is suitable for the manufacture of the present type of catalysts and this material in some instances has given the best results of any of the base compounds whose use is at present contemplated. The mineral dawsonite having the formula $Na_3Al(CO_3)_3.2Al(OH)_3$ is another mineral which may be used as a source of aluminum oxide, the calcination of this mineral giving an alkalized aluminum oxide which is apparently more effective as a support in that the catalyst is more easily regenerated after a period of service. Alumina in the form of powdered corundum is not suitable as a base.

It is best practice in the final steps of preparing aluminum oxide as a base catalyst to ignite it for some time at temperatures within the approximate range of from 600 to 750° C. This probably does not correspond to complete dehydration of the hydroxide but apparently gives a catalytic material of good strength and porosity so that it is able to resist for a long period of time the deteriorating effects of the service and reactivation periods to which it is subjected. In the case of the clays which may serve as base catalytic materials for supporting promoters, the better materials are those which have been acid-treated to render them more silicious. These may be pelleted or formed in any manner before or after the addition of the promoter catalyst since ordinarily they have a tendency to crumble under mechanical pressure to make a high percentage of fines. The addition of certain of the promoters, however, exerts a binding influence so that the formed materials may be employed without fear of structural deterioration in service.

The most general method for adding promoting materials to the preferred base catalysts, which if properly prepared have a high adsorptive capacity, is to stir the prepared granules of from approximately 4 to 20 mesh into solutions of salts which will yield the desired promoting compounds on ignition under suitable conditions. In some instances the granules may be merely stirred in slightly warm solutions of salts until the dissolved compounds have been retained on the particles by absorption or occlusion, after which the particles are separated from the excess solvent by settling or filtration, washed with water to remove excess solution, and then ignited to produce the desired residual promoter. In cases of certain compounds of relatively low solubility it may be necessary to add the solution in successive portions to the adsorbent base catalyst with intermediate heating to drive off solvent in order to get the required quantity of promoter deposited upon the surface and in the pores of the base catalyst. The temperatures used for drying and calcining after the addition of the promoters from solutions will depend entirely upon the individual characteristics of the compound added and no general ranges of temperature can be given for this step.

In some instances promoters may be deposited from solution by the addition of precipitant which cause the deposition of dissolved materials upon the catalyst granules. As a rule methods of mechanical mixing are not preferable, though in some instances in the case of hydrated or readily fusible compounds these may be mixed with the proper proportions of base catalysts and uniformly distributed during the condition of fusing or fluxing.

In regard to the relative proportions of base catalyst and promoting materials it may be stated in general that the latter are generally less than 10% by weight of the total composites. The effect upon the catalytic activity of the base catalysts caused by varying the percentage of any given compound or mixture of compounds deposited thereon is not a matter for exact calculation but more one for determination by experiment. Frequently good increases in catalytic effectiveness are obtainable by the deposition of as low at 1% or 2% of a promoting compound upon the surface and in the pores of the base catalyst, though the general average is about 5%.

In practicing the dehydrogenation of aliphatic hydrocarbons according to the present process a solid composite catalyst prepared according to the foregoing alternative methods is used as a filler in a reaction tube or chamber in the form of particles of graded size or small pellets and the hydrocarbon gas or vapor to be dehydrogenated is passed through the catalyst after being heated to the proper temperature, under a definite pressure and for a time of contact adapted to produce the results desired. The catalyst tube may be heated exteriorly if desired to maintain the proper reaction temperature.

As an alternative and frequently preferable method of operation with the present types of catalysts, they may be used as refractory filling material in the form of bricks or other forms in furnaces of the regenerative type which are alternately blasted and then used as heating means to effect the desired conversion reactions. In such an operation a regenerative chamber may be filled with alternate layers of ordinary non-catalytic refractory forms and layers of catalytic material. In this method of operation the heat necessary for the dehydrogenation reactions is added during the regenerating period which must be employed in any event to periodically remove carbonaceous deposits from the catalyst surfaces.

It has been found essential to the efficient and selective dehydrogenation of mono-olefinic hydrocarbons when using the present types of catalysts that the gaseous or vaporized materials be substantially free from water vapor. If appreciable amounts of steam are present the catalytic activity is adversely affected so that the active life is shortened, the need for regeneration becomes more frequent and a point is more quickly reached where regeneration is no longer effective. The reasons for this phenomenon are not entirely clear but may possibly be due to a certain degree of hydration of the more active catalytic components of the mixtures or the hydration of such supports as aluminum or magnesium oxides.

The exit gases from the tube or chamber may be passed through selective absorbents to combine with or absorb the diolefins produced. The diolefinic content of the total products may be catalytically condensed or polymerized directly to form synthetic rubber products as already mentioned. After the diolefins have been removed the residual gases may be recycled for further dehydrogenating treatment with or without removal of hydrogen.

Members of the present group of catalysts are selective in removing two hydrogen atoms from mono-olefinic hydrocarbon molecules to produce the corresponding diolefins without furthering to any great degree undesirable side reactions, and because of this show an unusually long period of activity in service as will be shown in later examples. When, however, their activity begins to diminish it is readily regenerated by the simple expedient of oxidizing with air or other oxidizing gas at a moderately elevated temperature, usually within the range employed in the dehydrogenating reactions. This oxidation effectively removes traces of carbon deposits which contaminate the surface of the particles and decrease their efficiency. It is characteristic of the present types of catalysts that they may be repeatedly regenerated without material loss of porosity or catalyzing efficiency.

The following examples are given to indicate the selective character of the dehydrogenation reactions produced by catalysts comprised within the present group, though they are merely selected from a large number and not given with the intent of unduly limiting the scope of the invention.

Example I

The general procedure for manufacturing the catalyst was to dissolve titanium nitrate in cold water and utilize this solution as a means of eventually adding titanium oxides to a carrier. A saturated solution of titanium nitrate in 100 parts of water was prepared and the solution was then added to about 250 parts by weight of activated alumina which has been produced by calcining bauxite at a temperature of about 700° C., followed by grinding and sizing to produce particles of approximately 8–12 mesh. Using the proportions stated, the alumina exactly absorbed the solution and the particles were first dried at 100° C. for about two hours and the temperature was then raised to 350° C. in a period of eight hours. After this calcining treatment the particles were placed in a reaction chamber and the titanium oxides treated in a current of hydrogen at about 500° C., when they were then ready for service.

The catalyst as prepared above was employed to dehydrogenate a mixture of n-butenes consisting of approximately equal parts of the alpha and beta compounds. A temperature of approximately 600° C., a pressure of 0.25 atmosphere and a contact time of 0.65 second were used. In the products which were condensed by cooling at —80° C., 1,3-butadiene was found to be present in a concentration of about 34 per cent, corresponding to a yield of about 19 per cent based on the materials charged. The identification was made by means of the reaction with maleic anhydride, and further identification was made by the formation of the compound: 1, 2, 3, 4-tetrabromobutane.

*Example II*

A catalyst was manufactured by precipitating zirconium hydroxide on granular particles of burned magnesite by adding the particles to a warm aqueous solution of zirconium sulfate to which a dilute solution of sodium carbonate was added with continual agitation until the zirconium was precipitated. The particles were then filtered from the solution and washed with warm water after which they were ignited to produce a residue of zirconium dioxide on the catalyst granules.

Using the catalyst prepared in the above manner the mixture of butenes was dehydrogenated at a temperature of 600° C., a pressure of 0.25 atmosphere and a contact time of 0.80 second. In the products which were condensed by cooling at —80° C. 1,3-butadiene was found to be present in a concentration of about 32 per cent, corresponding to a yield of about 18 per cent based on the materials charged. The identification was made by means of the reaction with maleic anhydride, and further identification was again made by the formation of the compound 1, 2, 3, 4-tetrabromobutene.

*Example III*

The procedure in the preparation of the catalyst was to dissolve cerous nitrate in water and utilize this solution as a means of adding cerium oxides to a carrier. 20 parts by weight of cerous nitrate was dissolved in about 100 parts by weight of water, and the solution was then added to about 250 parts by weight of activated alumina which had been produced by calcining bauxite at a temperature of about 700° C. followed by grinding and sizing to produce particles of approximately 8-12 mesh. Using the proportions stated the alumina exactly absorbed the solution and the particles were first dried at 100° C. for about two hours and the temperature was then raised to 350° C. in a period of eight hours. After this calcining treatment the particles were placed in a reaction chamber and the cerium dioxide reduced in a current of hydrogen at about 500° C. to produce principally the oxide $Ce_4O_7$ when they were then ready for service.

A mixture of unsym-methylethylethylene and tri-methylethylene obtained by dehydrogenation of tertiary amyl alcohol was dehydrogenated by passage over the catalyst at a temperature of 610° C., a pressure of 0.25 atmosphere and a contact time of 0.5 second. A once-through yield of 22% of isoprene was obtained, representing a conversion of about 50% of the pentene mixture charged. Isoprene was definitely identified by the preparation of its maleic anhydride addition product, cis-5-methyl $\Delta^4$ tetrahydrophthalic anhydride, M. P. 62.5° C. to 63.5° C. The production of isoprene indicates concomitant isomerization reactions during the course of the dehydrogenation and shows that there is a tendency for isomeric amylenes to produce important yields of isoprene. The liquid products yielded a rubber-like material by treatment with sodium and other catalysts suitable for this reaction.

*Example IV*

A catalyst was prepared for use in dehydrogenating normal butenes as representing mono-olefinic hydrocarbons by mixing about 3% by weight of finely divided hafnium dioxide with 4–20 mesh activated alumina particles, adding sufficient water to make a pasty mix which was afterwards dried to leave the dioxide deposited upon the alumina.

A mixture of unsym-methylethylethylene and tri-methylethylene obtained by dehydrogenation of tertiary amyl alcohol was dehydrogenated by passage over the catalyst at a temperature of 605° C., a pressure of 0.25 atmosphere and a contact time of 0.65 second. A once-through yield of 22% of isoprene was obtained, representing a conversion of about 48% of the pentene mixture charged. Isoprene was definitely identified by the preparation of its maleic anhydride addition product, cis-5-methyl $\Delta^4$ tetrahydrophthalic anhydride, M. P. 62.5° C. to 63.5° C. The liquid products again yielded a rubber-like material by treatment with sodium and other catalysts suitable for this reaction.

*Example V*

The catalyst used for dehydrogenating a mixture of butenes was prepared by incorporating a moderately saturated solution of thorium nitrate with activated alumina particles of approximately 10–30 mesh size. The concentration of the solution was adjusted so that uniform wetting of the particles was possible without having any appreciable excess of solution. The particles were then carefully dried and ignited at moderately elevated temperatures of the order of 300° C. to convert the nitrate into thorium dioxide.

Using the catalyst as prepared above, a mixture of approximately equal parts of alpha and beta butenes was dehydrogenated at a temperature of 610° C., a pressure of 0.25 atmosphere and a contact time of 0.85 second. In the products which were condensed by cooling at —80° C. 1,3-butadiene was found to be present in a concentration of about 30 per cent, corresponding to a yield of about 17 per cent based on the materials charged. The identification was made by means of the reaction with maleic anhydride, and further identification was made by the formation of the compound 1,2,3,4,-tetrabromobutane.

The foregoing specification and examples show clearly the character of the invention and the results to be expected in its application to the dehydrogenation of mono-olefinic hydrocarbons, although neither section is intended to be unduly limiting.

I claim as my invention:

1. A process for the dehydrogenation of mono-olefinic hydrocarbons having less than six carbon atoms in straight chain arrangement to produce diolefins therefrom, which comprises subjecting said mono-olefinic hydrocarbons at elevated temperatures of the order of 500–700° C., pressures of the order of 0.25 atmosphere absolute and times of less than 2 seconds to contact with a solid granular catalyst comprising essentially a major proportion by weight of aluminum oxide which has relatively low catalytic activity supporting an oxide of titanium which has relatively high catalytic activity.

2. A process for the dehydrogenation of mono-olefinic hydrocarbons having less than six carbon atoms in straight chain arrangement to produce diolefins therefrom, which comprises subjecting said mono-olefinic hydrocarbons at elevated temperatures of the order of 500–700° C., pressures of the order of 0.25 atmosphere absolute and times of less than 2 seconds to contact with a solid granular catalyst comprising essentially a major proportion by weight of aluminum oxide which has relatively low catalytic activity supporting an oxide of zirconium which has relatively high catalytic activity.

3. A process for the dehydrogenation of mono-olefinic hydrocarbons having less than six carbon atoms in straight chain arrangement to produce diolefins therefrom, which comprises subjecting said mono-olefinic hydrocarbons at elevated temperatures of the order of 500–700° C., pressures of the order of 0.25 atmosphere absolute and times of less than 2 seconds to contact with a solid granular catalyst comprising essentially a major proportion by weight of aluminum oxide which has relatively low catalytic activity supporting an oxide of cerium which has relatively high catalytic activity.

4. A process for converting mono-olefins having less than six carbon atoms in straight chain arrangement into diolefins which comprises subjecting the mono-olefin under dehydrogenating conditions to the action of a solid catalyst comprising a compound of a metal from the lefthand column of group IV of the periodic table and selected from the class consisting of titanium, zirconium, cerium, hafnium and thorium.

5. A process for converting mono-olefins having less than six carbon atoms in straight chain arrangement into diolefins which comprises subjecting the mono-olefin under dehydrogenating conditions to the action of a solid catalyst comprising an oxide of a metal from the lefthand column of group IV of the periodic table and selected from the class consisting of titanium, zirconium, cerium, hafnium and thorium.

6. A process for converting mono-olefins having less than six carbon atoms in straight chain arrangement into diolefins which comprises subjecting the mono-olefin under dehydrogenating conditions to the action of an aluminum oxide catalyst supporting a relatively small amount of a compound of a metal from the lefthand column of group IV of the periodic table and selected from the class consisting of titanium, zirconium, cerium, hafnium and thorium.

7. A process for converting mono-olefins having less than six carbon atoms in straight chain arrangement into diolefins which comprises subjecting the mono-olefin under dehydrogenating conditions to the action of an aluminum oxide catalyst supporting a relatively small amount of an oxide of a metal from the lefthand column of group IV of the periodic table and selected from the class consisting of titanium, zirconium, cerium, hafnium and thorium.

8. A process for converting mono-olefins having less than six carbon atoms in straight chain arrangement into diolefins which comprises subjecting the mono-olefin at a temperature of the order of 500 to 700° C. under pressure of about 0.25 atmosphere absolute and for a contact time of less than 2 seconds to the action of an aluminum oxide catalyst supporting a relatively small amount of an oxide of a metal from the lefthand column of group IV of the periodic table and selected from the class consisting of titanium, zirconium, cerium, hafnium, and thorium.

JACQUE C. MORRELL.